United States Patent
Vasyltsov

(10) Patent No.: US 7,916,860 B2
(45) Date of Patent: Mar. 29, 2011

(54) SCALAR MULTIPLICATION APPARATUS AND METHOD

(75) Inventor: Ihor Vasyltsov, Suwon-si (KR)

(73) Assignee: Samsung Electronics Co. Ltd., Gyeonggi-do (KR)

( * ) Notice: Subject to any disclaimer, the term of this patent is extended or adjusted under 35 U.S.C. 154(b) by 1412 days.

(21) Appl. No.: 11/377,456

(22) Filed: Mar. 17, 2006

(65) Prior Publication Data

US 2006/0212506 A1 Sep. 21, 2006

(30) Foreign Application Priority Data

Mar. 19, 2005 (KR) .................. 10-2005-0022929

(51) Int. Cl.
*G06F 7/52* (2006.01)
(52) U.S. Cl. .......... 380/30; 380/286; 708/620; 713/171; 713/193
(58) Field of Classification Search .............. 708/620; 380/1, 28, 30, 286; 713/170, 171, 180, 193
See application file for complete search history.

(56) References Cited

U.S. PATENT DOCUMENTS

| | | | | |
|---|---|---|---|---|
| 4,635,223 A | * | 1/1987 | Boone et al. | ............... 364/900 |
| 5,307,409 A | * | 4/1994 | Driscoll | ............... 380/2 |
| 6,108,419 A | | 8/2000 | LaMacchia et al. | |
| 6,141,420 A | * | 10/2000 | Vanstone et al. | ............... 380/30 |
| 6,144,740 A | | 11/2000 | Laih et al. | |
| 7,309,004 B1 | * | 12/2007 | Muschellack et al. | ...... 235/379 |
| 2001/0048742 A1 | | 12/2001 | Handschuh | |
| 2004/0234073 A1 | | 11/2004 | Sato et al. | |
| 2005/0031121 A1 | | 2/2005 | Lee | |

FOREIGN PATENT DOCUMENTS

| | | |
|---|---|---|
| EP | 1 296 224 | 3/2003 |
| EP | 1548687 A1 | 6/2005 |
| GB | 2 422 693 | 8/2006 |
| JP | 2003-216026 | 7/2003 |
| JP | 2003-255831 | 9/2003 |
| WO | WO 2006/010692 A2 | 2/2006 |

OTHER PUBLICATIONS

Combined Search and Examination Report dated May 14, 2007 for corresponding British Application No. 0707327.3.
Great Britain Search and Examination Report dated Jun. 29, 2006.
Wolfgang Rankl and Wolfgang Effing, Handbuch der Chipkarten, Hanser Verlag Munchen Wien, 3, Aufl. 1999, ISBN 3-446-21115-2, Seiten 499—508, 518, 519 (w/English Translation).
Office Action dated Oct. 6, 2010 for German Application No. 10 2006 013 975.5-31 (w/English Translation).

* cited by examiner

*Primary Examiner* — Benjamin E Lanier
*Assistant Examiner* — Hadi Armouche
(74) *Attorney, Agent, or Firm* — Harness, Dickey & Pierce, P.L.C.

(57) ABSTRACT

A scalar multiplication apparatus may include at least two encryptors, each adapted to receive an input point and a changed secret key to generate an encrypted output point; a first logic circuit adapted to receive the encrypted output points to perform a first logic operation; a second logic circuit adapted to receive a first logic operation result and a secret key to perform a second logic operation and generate the changed secret key; and a random number generator adapted to generate random number data. A scalar multiplication method may include receiving an input point and a changed secret key, generating first and second encrypted output points from the input point and changed secret key, performing a first logic operation on the first and second encrypted output points, and performing a second logic operation on a first logic operation result and a secret key and generating the changed secret key.

11 Claims, 11 Drawing Sheets

SCALAR MULTIPLICATION APPARATUS AND METHOD

PRIORITY STATEMENT

A claim of priority is made to Korean Patent Application No. 10-2005-0022929, filed on Mar. 19, 2005, in the Korean Intellectual Property Office, the disclosure of which is incorporated herein in its entirety by reference.

BACKGROUND OF THE INVENTION

1. Field of the Invention

Example embodiments of the present invention generally relate to cryptographic apparatuses and methods. More particularly, example embodiments of the present invention relate to scalar multiplication apparatuses and methods of using the same.

2. Description of the Related Art

To solve problems associated with modem confidential data communications, for example, satisfy continuous growing performance requirements hardware, cryptographic systems based on well-known crypto-algorithms may used. Crypto-algorithms, public key algorithms, such as Rivest-Shamir-Adleman (RSA) and Elliptic Curve Cryptography (ECC), and symmetric key algorithms, such as Data Encryption Standard (DES) and Advanced Encryption Standard (AES), are well known.

However, in addition to hardware-oriented crypto-systems, new crypto-analysis methods such as Side-Channel Analysis (SCA) have been developed. There may be several different techniques of attacks, including Timing Analysis, Power Analysis, Electro-Magnetic Analysis, and Different Faults Analysis (DFA). These techniques may successfully attack the crypto-systems and obtain secret keys with less time and effort.

Accordingly, counter-measurements against the crypto-analysis methods such as SCA have developed. An example of SCA technique is DFA.

FIG. 1 is a block diagram of a conventional art cryptographic apparatus 100. Referring to FIG. 1, the cryptographic apparatus 100 may include a scalar multiplication unit 110 including parallel EC operation units 120 and 130, and a comparing and outputting unit 140. For several operations each of the EC operation units 120 and 130 may generate encrypted final output points $Q^1$ and $Q^2$ by performing a scalar multiplication operation of a previous point and a secret key according to an (Elliptic Curve Cryptography (ECC) algorithm. The comparing and outputting unit 140 may determine whether the output points $Q^1$ and $Q^2$ are the same, transmits any one of the output points $Q$ to a post-processor if they are the same, and does not output the encrypted output points if they are not the same. That is, if a fault occurs during the scalar multiplication operation for the encryption, the encrypted output points generated by the ECC operation units 120 and 130 may be different from each other. The encrypted output points may not be transmitted to the post-processor in order to prevent a leak of confidential information.

For a crypto-system such as a smart card system including the conventional art cryptographic apparatus 100, a cryptanalyst (attacker) may deliberately generate a fault, such as power glitches, electromagnetic influences or optical influences, during the scalar multiplication computation, generate the same encrypted output points as that generated by the parallel EC operation units 120 and 130, and may analyze faulty output points and obtain a secret key used by the system. An attacker may easily obtain confidential information in the conventional cryptographic methods by simply checking output points encrypted in parallel. In addition, it is known that the conventional art cryptographic methods may be weak to counter a Sign Change Fault (SCF) attack against a Non-Adjacent Form (NAF)-based scalar multiplication algorithm.

SUMMARY OF EXAMPLE EMBODIMENTS OF THE PRESENT INVENTION

In an example embodiment of the present invention, a scalar multiplication apparatus includes at least two encryptors each adapted to receive an input point and a secret key to generate an output point, a first logic circuit adapted to receive the first and second encrypted output points to perform a first logic operation, and a second logic circuit adapted to receive the first logic operation result of the first logic circuit and the secret key to perform a second logic operation.

In another example embodiment of the present invention, a scalar multiplication apparatus includes a first encryptor adapted to receive an input point and a secret key to generate a first encrypted output point, a second encryptor adapted to receive the first encrypted output point and the secret key to perform an inverse operation and generate a second encrypted output point, a first XOR circuit adapted to receive the input point and second encrypted output point to perform a first XOR operation, and a second logic circuit adapted to receive the first logic operation result of the first logic circuit and the secret key to perform a second logic operation.

Also in another example embodiment of the present invention, a scalar multiplication method includes receiving an input point and a secret key, generating a first encrypted output point and a second encrypted output point from the input point and the secret key, performing a first logic operation on the first encrypted output point and the second encrypted output point, and performing a second logic operation on the first logic operation result and the secret key.

In another example embodiment of the present invention, a scalar multiplication method includes receiving an input point and an input secret key, generating an encrypted first output point from the input point and a secret key, generating an encrypted second output point from the encrypted first output point and the secret key by performing an inverse operation, performing a first logic operation on the input point and the encrypted second output point, and performing a second logic operation on the first logic operation result and the secret key.

BRIEF DESCRIPTION OF THE DRAWINGS

The present invention will become more apparent with the descriptions of example embodiments thereof with reference to the attached drawings in which.

DETAILED DESCRIPTION OF EXAMPLE EMBODIMENTS OF THE INVENTION

Figure 1:
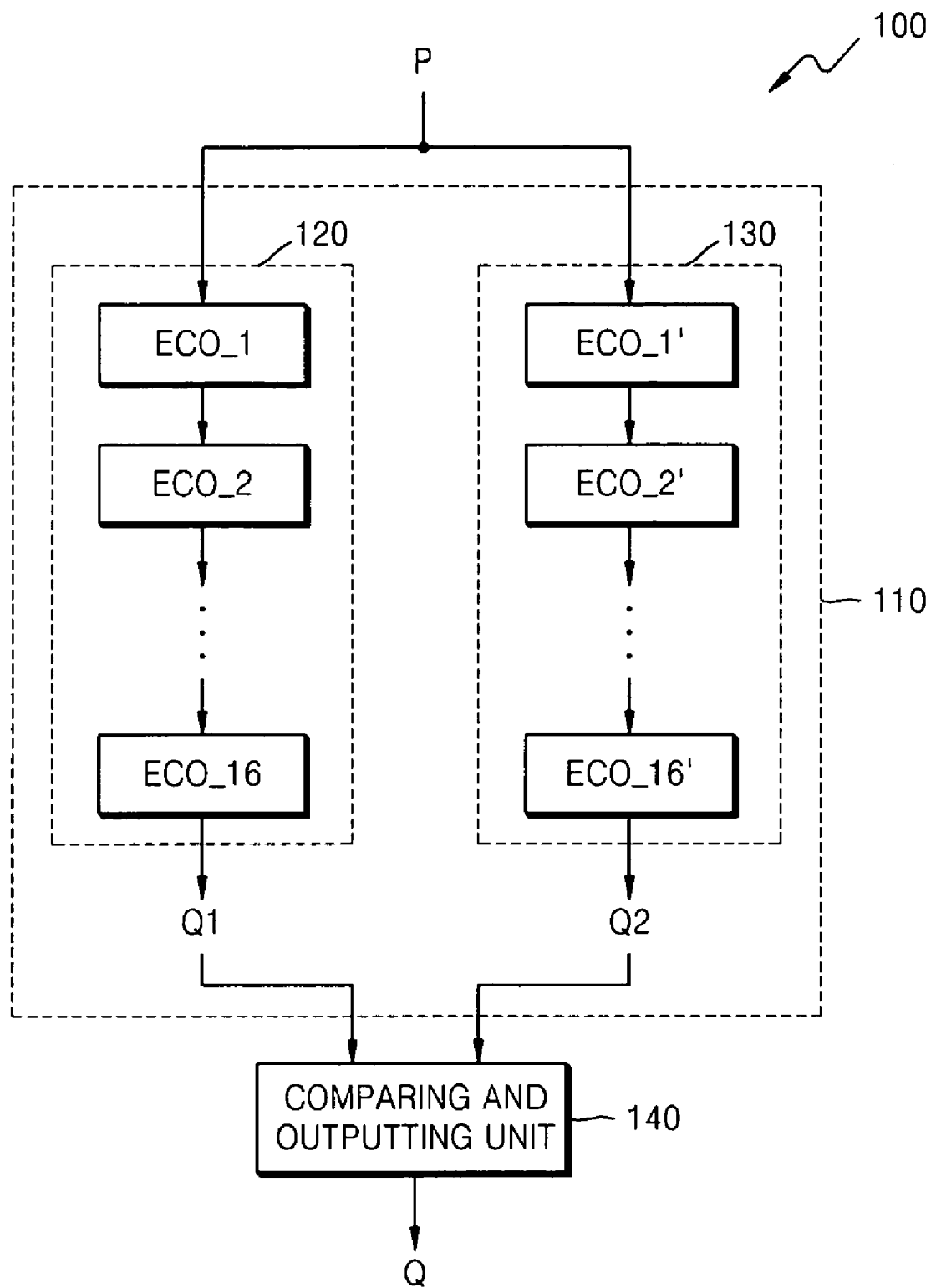
FIG. 1 is a block diagram of a conventional art cryptographic apparatus.

Hereinafter, example embodiments of the present invention will be described in detail with reference to the accompanying drawings. Like reference numbers are used to refer to like elements through at the drawings.

An elliptic curve E is a set of points (x,y) which satisfy the elliptic curve (EC) operation (Equation 1) in the Weierstrass form:

$$E: y^2 + a_1xy + a_3y = x^3 + a_2x^2 + a_4x + a_6 \quad (1)$$

For cryptographic applications, the EC may be used over a prime finite field GF(p) or a binary finite field GF($2^n$). Here, GF( ) denotes a Galois field, a prime finite field is a field containing a prime number of elements, and a binary finite field is a field containing $2^n$ elements.

If p is an odd prime number, then there is a unique field GF(p) with p elements. For the prime finite field case, Equation 1 is changed to:

$$\begin{cases} GF(p), p > 3 \\ y^2 = x^3 + ax + b; \\ 4a^3 + 27b^2 \neq 0 (\text{mod} p) \end{cases} \quad (2)$$

If $n \geq 1$, then there is a unique field GF($2^n$) with $2^n$ elements. For the binary finite field case, Equation 1 is:

$$\begin{cases} GF(2^n) \\ y^2 + xy = x^3 + ax^2 + b; \\ b \neq 0 \end{cases} \quad (3)$$

The elliptic curves have the point addition operation, and in special circumstance the point doubling operation occur in the following. To get the resulted point R=P+Q=($x_3$, $y_3$) from two points P=($x_1$, $y_1$) and Q=($x_2$, $y_2$), it is requested to perform the next finite field operation in GF(p):

$$P \neq Q \Rightarrow \begin{cases} \theta = \frac{y_2 - y_1}{x_2 - x_1}; \\ x_3 = \theta^2 - x_1 - x_2; \\ y_3 = \theta(x_1 - x_3) - y_1; \end{cases} \quad (4)$$

When it is the point doubling operation (P=Q), then the next finite field operation (Equation 5) should be performed in GF(p):

$$P = Q \Rightarrow \begin{cases} \theta = \frac{3x^2 + a}{2y}; \\ x_3 = \theta^2 - 2x; \\ y_3 = \theta(x - x_3) - y; \end{cases} \quad (5)$$

Equations 4 and 5 are the same as Equations 6 and 7 in the case of the binary finite field GF($2^n$).

$$P \neq Q \Rightarrow \begin{cases} \theta = \frac{y_2 + y_1}{x_2 + x_1}; \\ x_3 = \theta^2 + \theta + x_1 + x_2 + a; \\ y_3 = \theta(x_1 + x_3) + x_3 + y_1; \end{cases} \quad (6)$$

$$P = Q \Rightarrow \begin{cases} \theta = x + \frac{y}{x}; \\ x_3 = \theta^2 + \theta + a; \\ y_3 = \theta(x + x_3) + x_3 + y; \end{cases} \quad (7)$$

An operation in the Elliptic Curve Cryptography (ECC) may be a scalar point multiplication which may include computing Q=k·P=P+P+ . . . +P (k times), where k is a secret key. The scalar point multiplication may be based on point operations, which in turn are based on finite field operations, as illustrated in the above Equations. A related operation may be the discrete logarithm, which may include computing k from P and Q=k·P.

There may be different possible representations of the point (dot) on the EC besides the Affine representation (used in the above equations), for example, Ordinary Projective, Jacobian Projective, Lopez-Dahab Projective, Hessian, etc. In example embodiments of the present invention, point representations in the Weierstrass Affine such as Equations 1 to 7 may be considered. However, a scalar multiplication apparatus and method are not limited thereto and may be applied to any type of finite field and/or point representation.

An attacker may deliberately induce faults, for example, power glitches, electromagnetic influences or optical influences, during the scalar multiplication operation in ECC and analyze faulty output data. In a DFA process, the attacker may induce a fault to the input point P in a crypto-system and obtain a faulty output point $\tilde{Q}$=k·$\tilde{P}$. The attacker may define a cryptographically weak elliptic curve (EC) $\tilde{E} \neq E$, on which the faulty output point exists, e.g., $\tilde{Q} \in \tilde{E}$. The attacker may try to solve a discrete logarithm problem, which includes computing k from $\tilde{P}$ and $\tilde{Q}$=k·$\tilde{P}$ on the cryptographically weak EC $\tilde{E} \neq E$. By repeating the above procedures, the attacker may obtain the secret key included in the crypto-system.

In example embodiments of the present invention, instead of a secret key but a modified secret key may be obtained by DFA attacks. That is, although the attacker may solve the discrete logarithm problem by deliberately inducing DFA attack, $\tilde{Q}$=$\tilde{k}$·$\tilde{P}$ instead of $\tilde{Q}$=k·$\tilde{P}$ may be output as the modified output point. Accordingly, the attacker may only obtain a modified secret key $\tilde{k}$ instead of the real secret key k.

Figure 2:
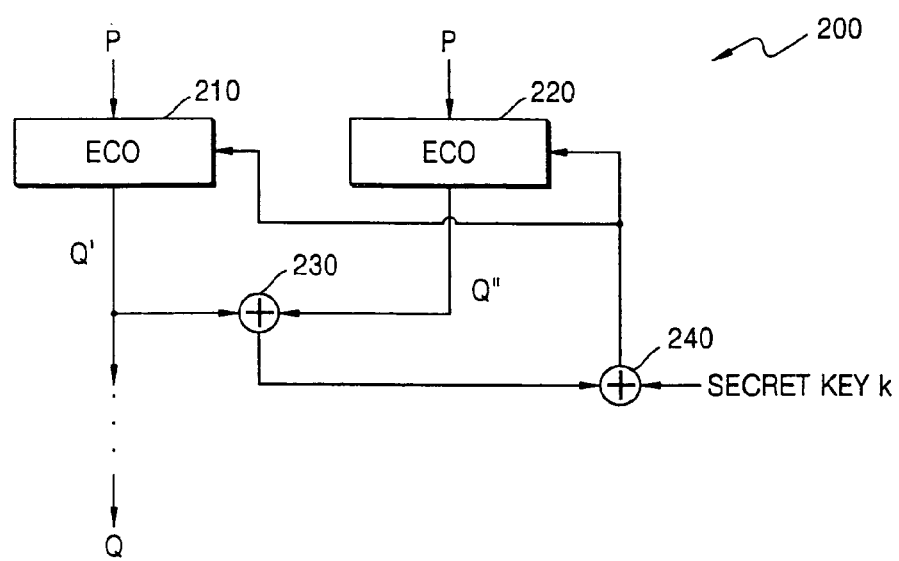
FIG. 2 is a block diagram of a scalar multiplication apparatus according to an example embodiment of the present invention.
Figure 3:
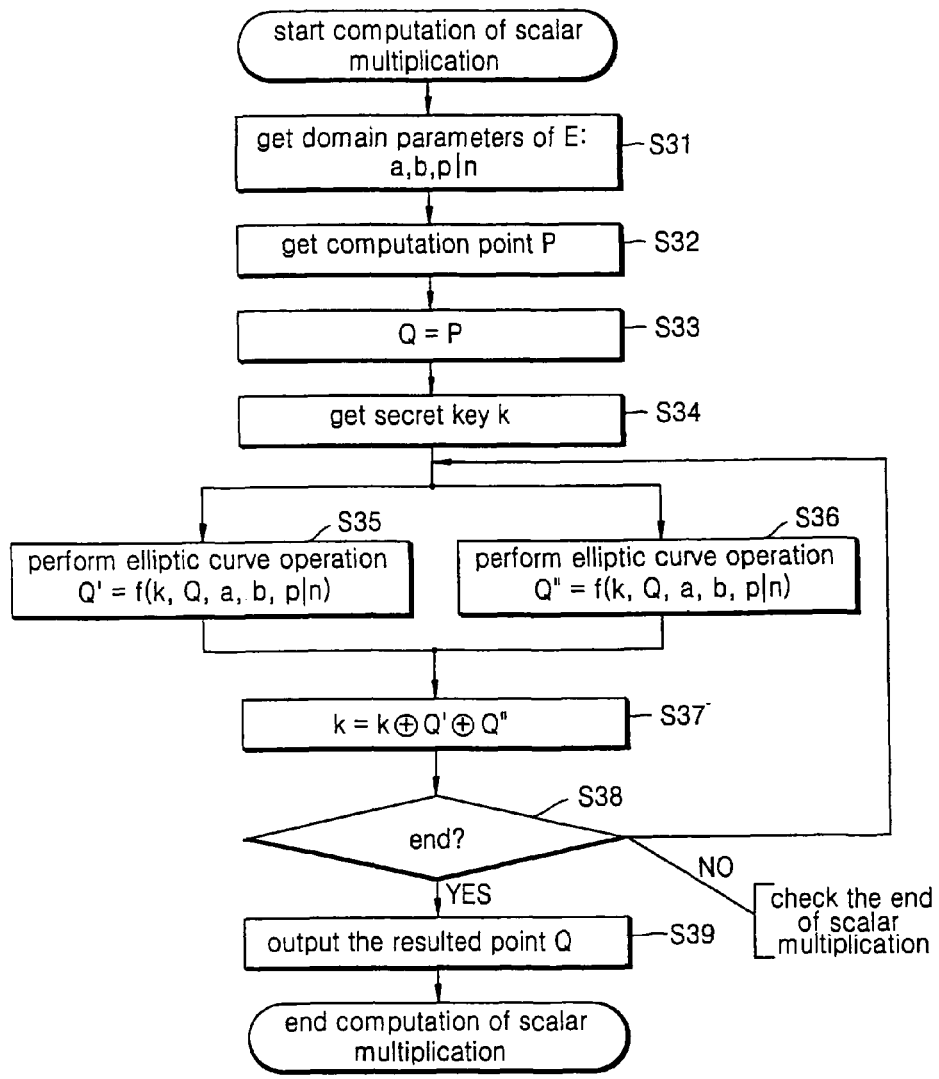
FIG. 3 is a flowchart illustrating parallel processing of the scalar multiplication apparatus of FIG. 2.
Figure 4:
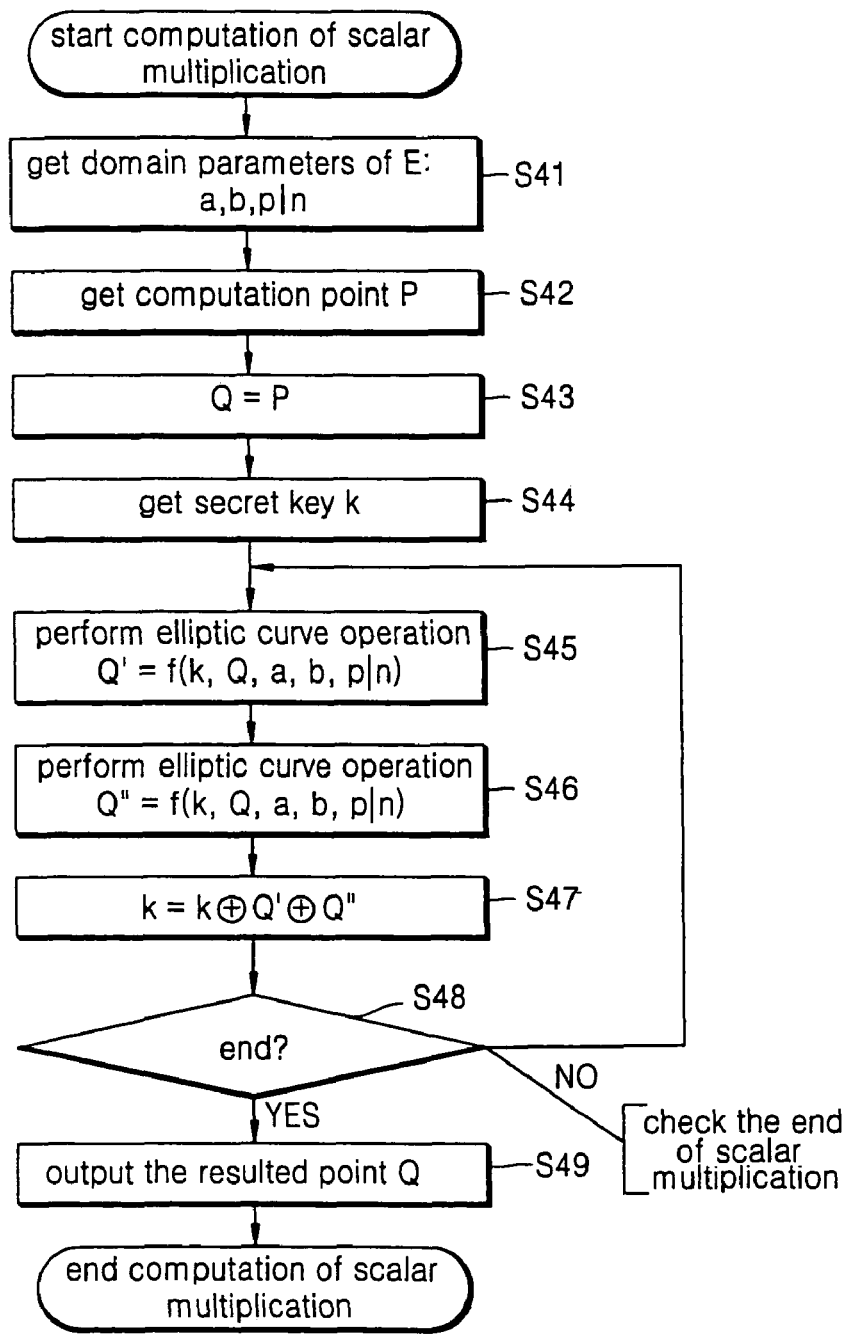
FIG. 4 is a flowchart illustrating sequential processing of the scalar multiplication apparatus of FIG. 2.

FIG. 2 is a block diagram illustrating a scalar multiplication apparatus 200 according to an example embodiment of the present invention. Referring to FIG. 2, the scalar multiplication apparatus 200 may include a first encryptor 210, a second encryptor 220, a first XOR circuit 230, and a second XOR circuit 240. The first and second encryptors 210 and 220 may encrypt an input point P. FIG. 3 illustrates simultaneous parallel EC operations and FIG. 4 illustrates sequential EC operations. For explanation purposes, XOR circuits are described, but example embodiments of the present invention are not limited to XOR circuits, and other logic circuits may be used.

Each of the first and second encryptors 210 and 220 may receive EC domain parameters from a protected non-volatile memory (not shown) (S31 of FIG. 3 and S41 of FIG. 4). Here, the domain parameters may be a,b,p in the case of GF(p) and a,b,n in the case of $GF(2^n)$. The protected non-volatile memory may be provided inside or outside each of the first and second encryptors 210 and 220.

Each of the first and second encryptors 210 and 220 may receive the input point P to be encrypted (S32 of FIG. 3 and S42 of FIG. 4) and allocate the input point P as an output point Q (S33 of FIG. 3 and S43 of FIG. 4). Each of the first and second encryptors 210 and 220 may receive a (modified) secret key k from the protected non-volatile memory (S34 of FIG. 3 and S44 of FIG. 4).

The first encryptor 210 may generate an output point Q' from the input point P (allocated as the output point Q in operations S33 of FIG. 3 and S43 of FIG. 4) and the (modified) secret key k output from the second XOR circuit 240 to perform an EC operation Q'=f(k,Q,a,b,p|n) as defined in Equations 1 to 7 using the EC domain parameters (S35 of FIG. 3 and S45 of FIG. 4). As illustrated in FIG. 3, in a parallel EC operation with the first encryptor 210, the second encryptor 220 may generate an encrypted output point Q" from the input point P (allocated as the output point Q in operation S33 of FIG. 3) and the (modified) secret key k output from the second XOR circuit 240 to perform the same EC operation Q"=f(k,Q,a,b,p|n) as in the first encryptor 210 using the EC domain parameters (S36 of FIG. 3).

FIG. 4 illustrates the sequential operations of the first and second encryptors 210 and 220. After the EC operation in the first encryptor 210 is performed, the second encryptor 220 may generate an encrypted output point Q" from the input point P (allocated as the output point Q in operation S43 of FIG. 4) and the (modified) secret key k output from the second XOR circuit 240 by performing the same EC operation Q"=f(k,Q,a,b,p|n) as in the first encryptor 210 using the EC domain parameters (S46 of FIG. 4).

In operations S37 of FIG. 3 and S47 of FIG. 4, the first XOR circuit 230 may perform an XOR operation on the output point Q' of the first encryptor 210 and the output point Q" of the second encryptor 220. Also, in operations S37 of FIG. 3 and S47 of FIG. 4, the second XOR circuit 240 may perform an XOR operation on the operation result of the first XOR circuit 230 and the input secret key k, and generate the XOR operation result as the (modified) secret key k to be input to the first and second encryptors 210 and 220, respectively.

According to the above description, if no fault is induced in the first and second encryptors 210 and 220, the output points Q' and Q" of the first and second encryptors 210 and 220 may be considered to be the same, and the operation result of the second XOR circuit 240 maintains the input secret key value k. However, if a fault is induced to the first encryptor 210 or the second encryptor 220, the operation result of the second XOR circuit 240 may be a modified secret key value $\tilde{k} \neq k$.

It may be assumed that the attacker cannot induce the same fault to both the first encryptor 210 and the second encryptor 220 regardless of whether the first encryptor 210 and the second encryptor 220 are performed in EC parallel or sequential operation.

If the scalar multiplication operation ends (S38 of FIG. 3 and S48 of FIG. 4), the encrypted output point Q=k·P or Q=$\tilde{k}$·P may be output from the first encryptor 210 or the second encryptor 220 to a post-processor in an upper layer (S39 of FIG. 3 and S49 of FIG. 4). If the scalar multiplication operation does not end, the first and second encryptors 210 and 220 may repeatedly perform the EC operation using the modified secret key value k output from the second XOR circuit 240. In order to better counter DFA attacks, several EC operations in the first and second encryptors 210 and 220 may be performed. However, in example embodiments, the EC operation may be repeated two or three times.

In an example embodiment, the original secret key value $k$ may be substituted by the modified secret key value $\tilde{k} \neq k$ by performing at least one point addition operation and at least one point doubling operation after a fault induction against the DFA attacks. As a result, the faulty data may be diffused, and the attacker cannot easily obtain the secret key k.

In the sequential processing method illustrated in FIG. 4, the second encryptor 220 may share basic field operation hardware such as XOR operators, multipliers, adders and subtractors included in the first encryptor 210. If a permanent fault exists at a certain position of the basic field operation hardware, the output points Q' and Q" of the first and second encryptors 210 and 220 may be the same.

Figure 5:
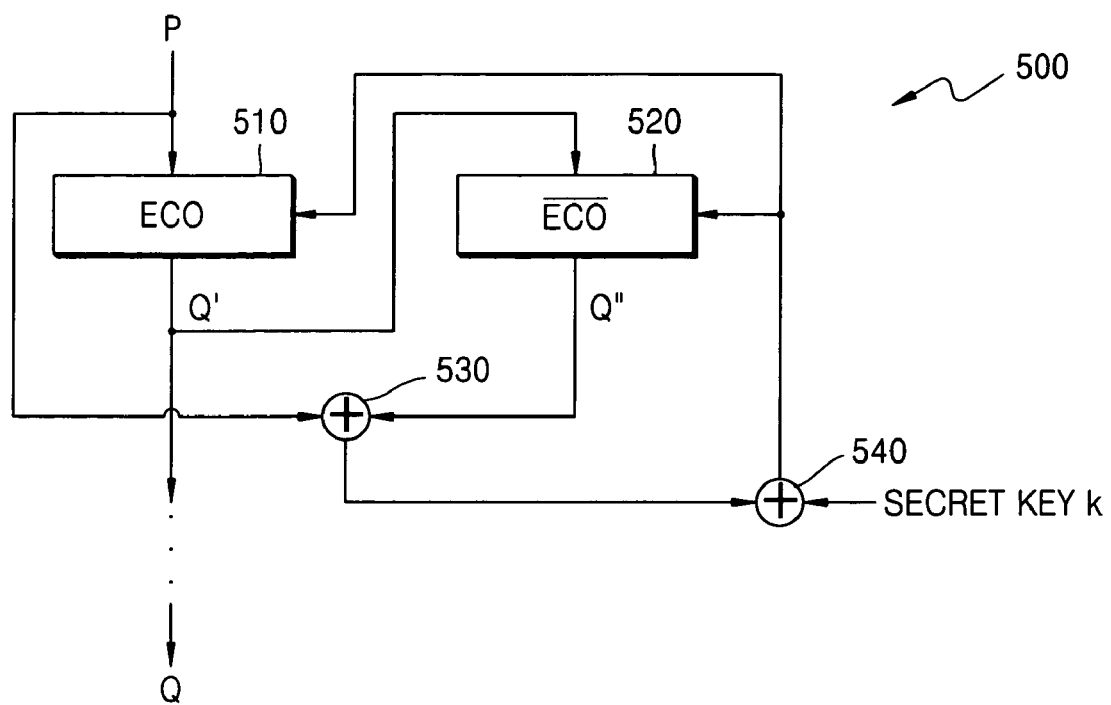
FIG. 5 is a block diagram of a scalar multiplication apparatus according to another example embodiment of the present invention.
Figure 6:
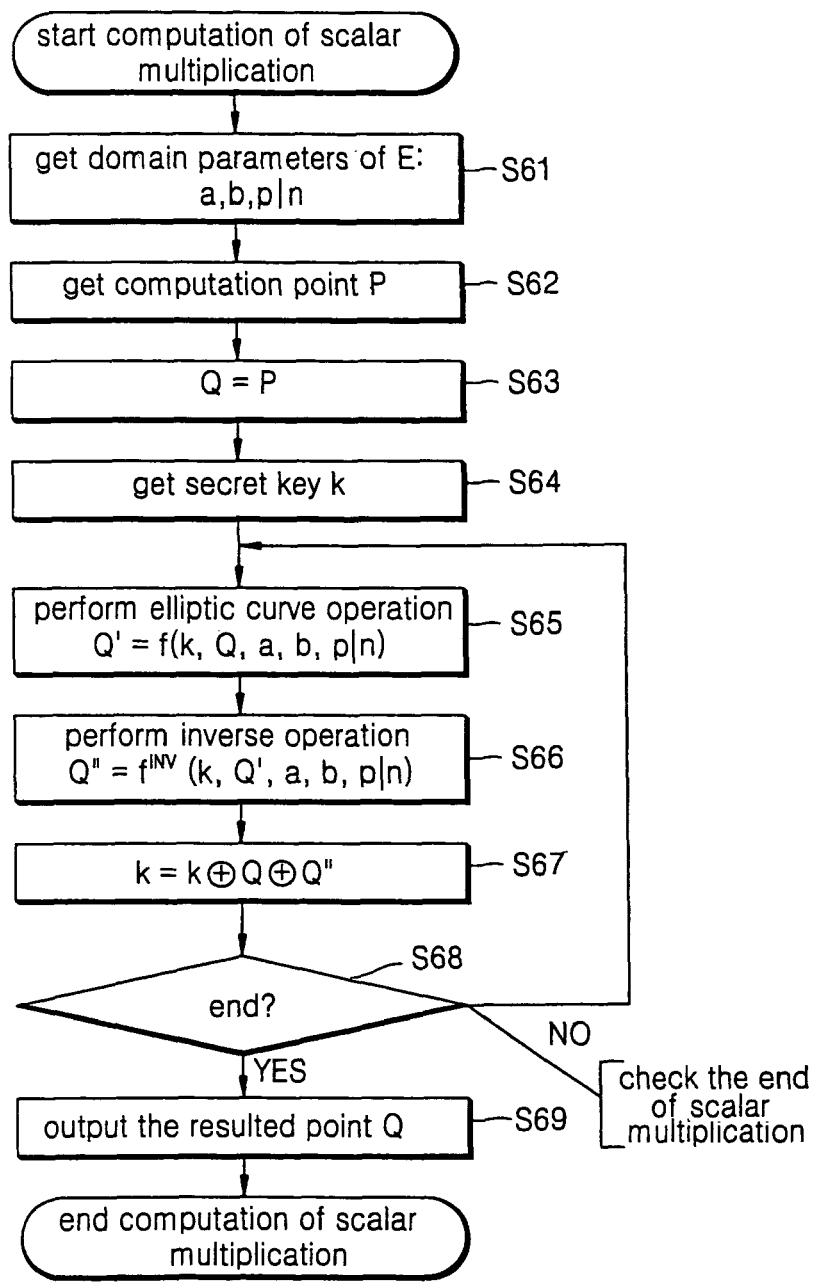
FIG. 6 is a flowchart illustrating an operation of the scalar multiplication apparatus of FIG. 5.

To counter this possibility, an inverse EC operation $f^{INV}$ recovering the original input point P from the EC operation result Q may be used. A scalar multiplication apparatus 500 according to an example embodiment of the present invention is illustrated in FIG. 5. Referring to FIG. 5, the scalar multiplication apparatus 500 may include a first encryptor 510 performing the EC operation and, a second encryptor 520 performing the inverse EC operation, a first XOR circuit 530 and a second XOR circuit 540. FIG. 6 is a flowchart illustrating a description of an operation of the scalar multiplication apparatus 500 of FIG. 5. Except operation S66 of FIG. 6 in which the second encryptor 520 performs the inverse EC operation, the remaining operations may be similar to corresponding operations of FIG. 4.

Each of the first encryptors 510 may receive EC domain parameters from a protected non-volatile memory (not shown) in operation S61. Encryptors 510 may receive the input point P to be encrypted in operation S62 and allocate the input point P as a point Q in operation S63. Each of the first and second encryptors 510 and 520 may also receive a (modified) secret key k from the protected non-volatile memory in operation S64.

The first encryptor 510 may generate an encrypted output point Q' from the input point P (allocated as the resulted point Q in operation S63) and the (modified) secret key k output from the second XOR circuit 540 to perform an EC operation Q'=f(k,Q,a,b,p|n) using the EC domain parameters in operation S65.

The second encryptor 520 may generate an output point Q" from the output point Q' and the (modified) secret key k output from the second XOR circuit 540 by performing an inverse EC operation Q"=$f^{INV}$(k,Q',a,b,p|n) opposite to the EC operation of the first encryptor 510 using the EC domain parameters in operation S66.

In operation S67, the first XOR circuit 530 may perform an XOR operation of the input point P (allocated as the resulted point Q in operation S63) and the output point Q" of the second encryptor 520. Also, in operation S67, the second XOR circuit 540 may perform an XOR operation of the operation result of the first XOR circuit 530 and the input secret key k, and generate the XOR operation result as the (modified) secret key k input to the first and second encryptors 510 and 520.

If no fault is induced in the first and second encryptors 510 and 520, the output point Q" of the second encryptor 520 may be equal to the input point P, and the operation result of the second XOR circuit 540 maintains the input secret key value k. However, if a fault is induced in the first encryptor 510 or the second encryptor 520, the operation result of the second XOR circuit 540 may be a modified secret key value $\tilde{k} \neq k$.

If the scalar multiplication operation ends in operation S68, the encrypted output point Q=k·P or Q=$\tilde{k}$·P may be output from the first encryptor 510 or the second encryptor 520 to a post-processor in an upper layer in operation S69. If the scalar multiplication operation does not end, the first and second encryptors 510 and 520 may repeatedly perform the EC operation using the modified secret key value k output from the second XOR circuit 540.

Figure 7:
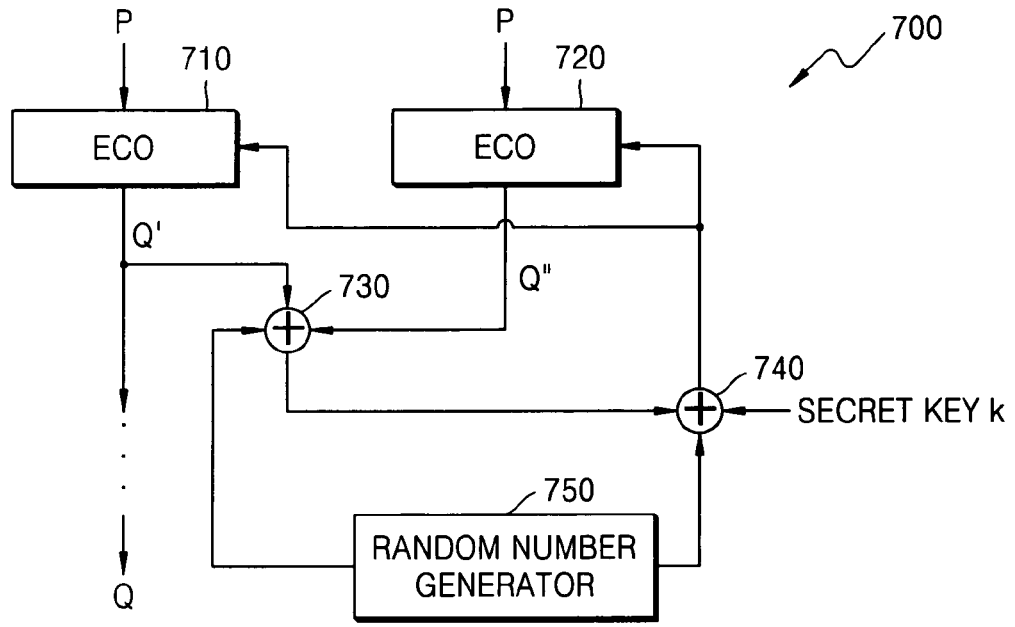
FIG. 7 is a block diagram of a scalar multiplication apparatus in which a random number generator is further included in the scalar multiplication apparatus of FIG. 2 according to an example embodiment of the present invention.

FIG. 7 is a block diagram of a scalar multiplication apparatus 700 in which a random number generator 750 is further included in a scalar multiplication apparatus 200 according to an example embodiment of the present invention. A first encryptor 710, a second encryptor 720, a first XOR circuit 730, and a second XOR circuit 740 included in the scalar multiplication apparatus 700 may have similar operations and functions to the respective device illustrated in FIG. 2. However, the scalar multiplication apparatus 700 may further include the random number generator 750.

Referring to FIG. 7, the random number generator 750 may generate arbitrary random number data and output the generated random number data to the first XOR circuit 730 and the second XOR circuit 740. The first XOR circuit 730 may perform an XOR operation of an encrypted output point $Q'$ generated by the first encryptor 710, an encrypted output point $Q''$ generated by the second encryptor 720, and the random number data generated by the random number generator 750. The second XOR circuit 740 may perform an XOR operation of the operation result of the first XOR circuit 730, an input secret key $k$, and the random number data, and may generate the XOR operation result as the (modified) secret key value $k$ input to the first encryptor 710 and the second encryptor 720.

Figure 8:
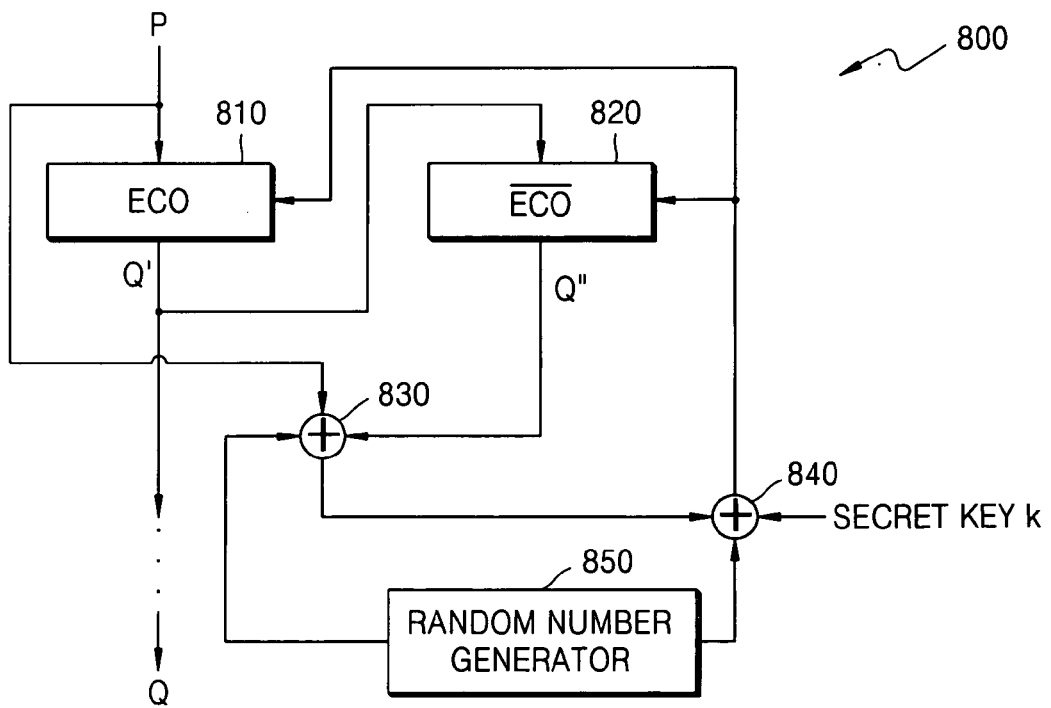
FIG. 8 is a block diagram of a scalar multiplication apparatus in which a random number generator is further included in the scalar multiplication apparatus of FIG. 5 according to an example embodiment of the present invention.

FIG. 8 is a block diagram of a scalar multiplication apparatus 800 in which a random number generator 850 is further included in a scalar multiplication apparatus 500 according to another example embodiment of the present invention. A first encryptor 810, a second encryptor 820, a first XOR circuit 830 and a second XOR circuit 840 included in the scalar multiplication apparatus 800 may have similar operations and functions to the respective devices illustrated in FIG. 5. However, the scalar multiplication apparatus 800 may further include the random number generator 850.

Referring to FIG. 8, the random number generator 850 may generate arbitrary random number data and output the generated random number data to the first XOR circuit 830 and the second XOR circuit 840. The first XOR circuit 830 may perform an XOR operation of an input point $P$ (allocated as the resulted point $Q$ in operation S63 of FIG. 6), an encrypted output point $Q''$ generated by the second encryptor 820, and the random number data generated by the random number generator 850. The second XOR circuit 840 may perform an XOR operation of the operation result of the first XOR circuit 830, an input secret key $k$ and the random number data, and may generate the XOR operation result as the (modified) secret key value $k$ input to the first encryptor 810 and the second encryptor 820.

As shown in FIGS. 7 and 8, the random number generators 750 and 850 may be included to exclude the possibility that the attacker sets some data registers in the EC operations to zero and easily obtain the secret key $k$ from $Q$ output as the result of the setting.

Figure 9:
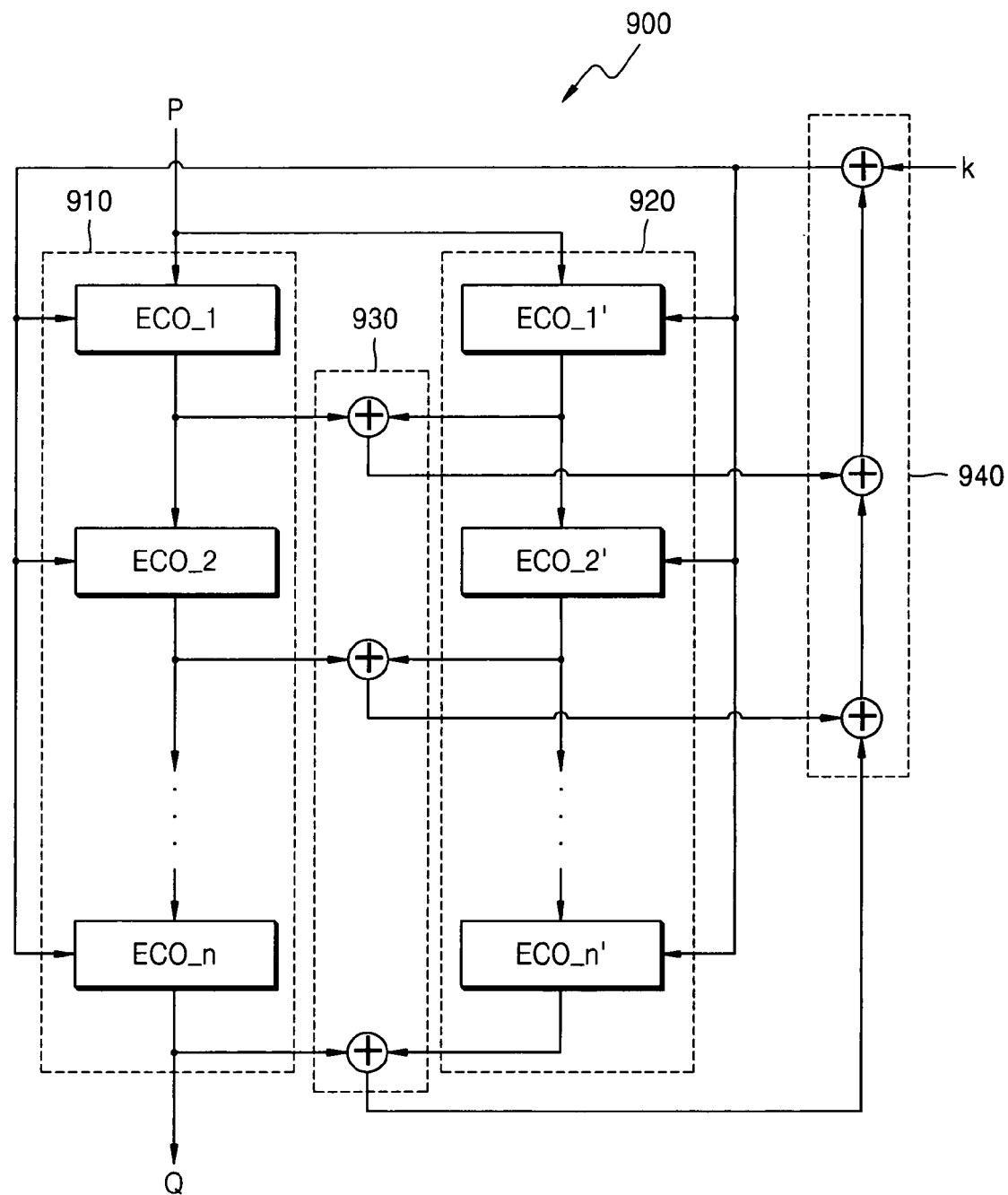
FIG. 9 is a block diagram of a scalar multiplication apparatus having a scalable regular structure for hardware pipeline implementation of FIG. 2 according to an example embodiment of the present invention.

FIG. 9 is a block diagram of a scalar multiplication apparatus 900 having a scalable regular structure for a hardware pipeline implementation according to example embodiments of the present invention. Referring to FIG. 9, a first encryptor 910, a second encryptor 920, a first XOR circuit 930, and a second XOR circuit 940 included in the scalar multiplication apparatus 900 may have similar operations and functions to the respective devices illustrated in FIG. 2. However, the scalar multiplication apparatus 900 may have a structure where the first encryptor 910 and the second encryptor 920 repeatedly perform the EC operations. For example, the first encryptor 910 and the second encryptor 920 may perform a first EC operation ECO_1, ECO_1', a second EC operation ECO_2, ECO_2', and until the nth EC operation ECO_n, ECO_n'.

Each of the first encryptor 910 and the second encryptor 920 may generate an encrypted output point from an input point $P$ by performing the EC operation. For example, each of the first encryptor 910 and the second encryptor 920 may generate an encrypted output point for a second operation from the encrypted output point of a first operation by performing the EC operation. The operation may be consecutively performed for at least two operations.

The first XOR circuit 930 may perform XOR operations of the encrypted output points generated for respective operations of the first encryptor 910 and the encrypted output points generated for respective operations of the second encryptor 920. The second XOR circuit 940 may perform an XOR operation of the operation results of the first XOR circuit 930 and a secret key $k$, and generate the XOR operation result as the (modified) secret key $k$ input to the first and second encryptors 910 and 920.

Figure 10:
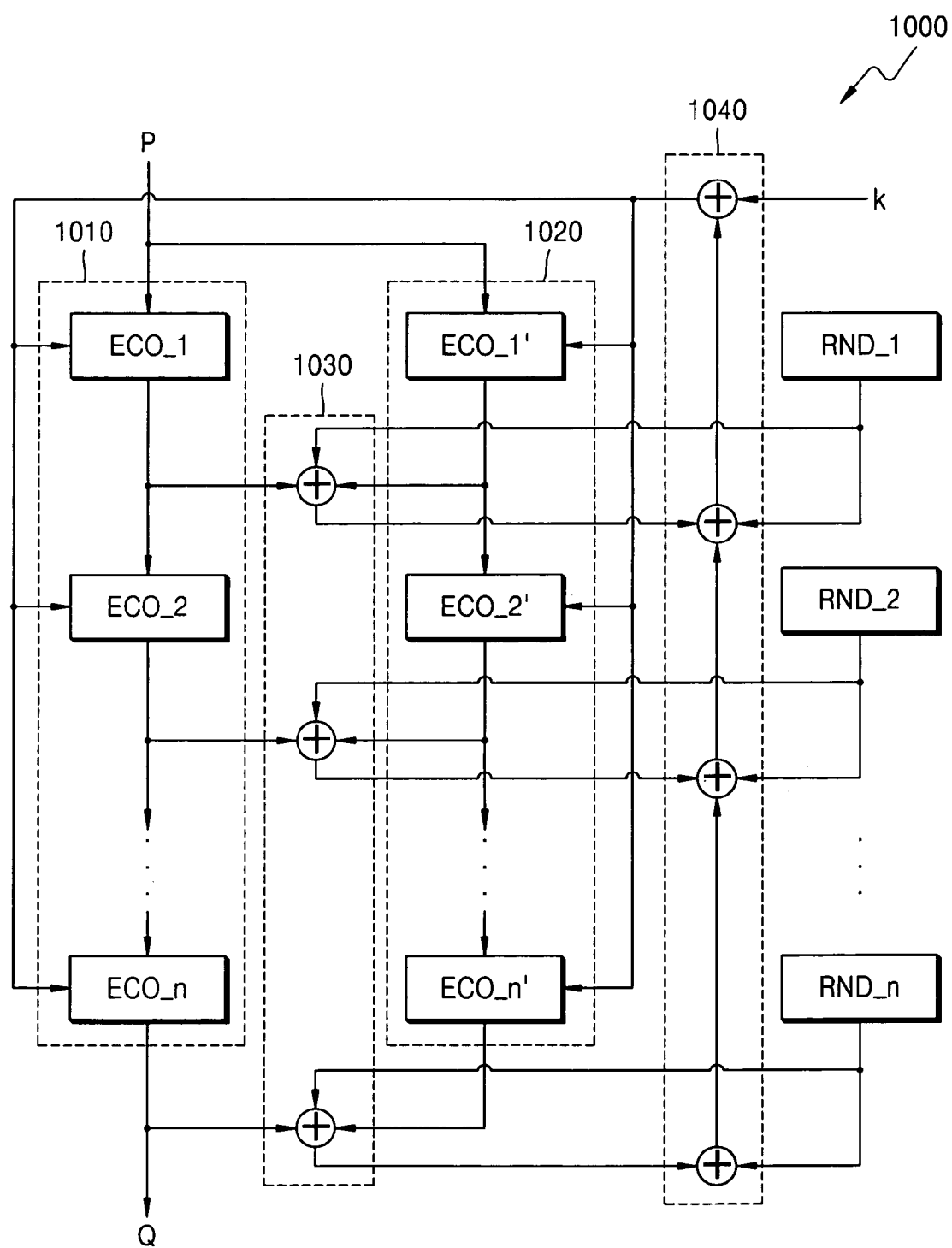
FIG. 10 is a block diagram of a scalar multiplication apparatus in which the scalar multiplication apparatus of FIG. 9 operates by random number data according to an example embodiment of the present invention.

FIG. 10 is a block diagram of a scalar multiplication apparatus 1000 in which the scalar multiplication apparatus 900 of FIG. 9 may operate by random number data generated by a random number generator (not shown) according to an example embodiment of the present invention. Referring to FIG. 10, a first encryptor 1010, a second encryptor 1020, a first XOR circuit 1030, and a second XOR circuit 1040 included in the scalar multiplication apparatus 1000 may have similar operations and functions to the respective devices of FIG. 9. However, the scalar multiplication apparatus 1000 may operate by random number data $RND\_1, RND\_2, \ldots, RND\_n$ of respective operations generated by a random number generator.

The first XOR circuit 1030 may perform XOR operations of the encrypted output points generated for respective operations of the first encryptor 1010, the encrypted output points generated for respective operations of the second encryptor 1020, and the random number data $RND\_1, RND\_2, \ldots, RND\_n$ of respective operations. The second XOR circuit 1040 performs an XOR operation of the respective operation results of the first XOR circuit 1030, a secret key $k$, and the respective random number data $RND\_1, RND\_2, \ldots, RND\_n$ to generate the XOR operation result as the (modified) secret key $k$ input to the first and second encryptors 1010 and 1020.

Figure 11:
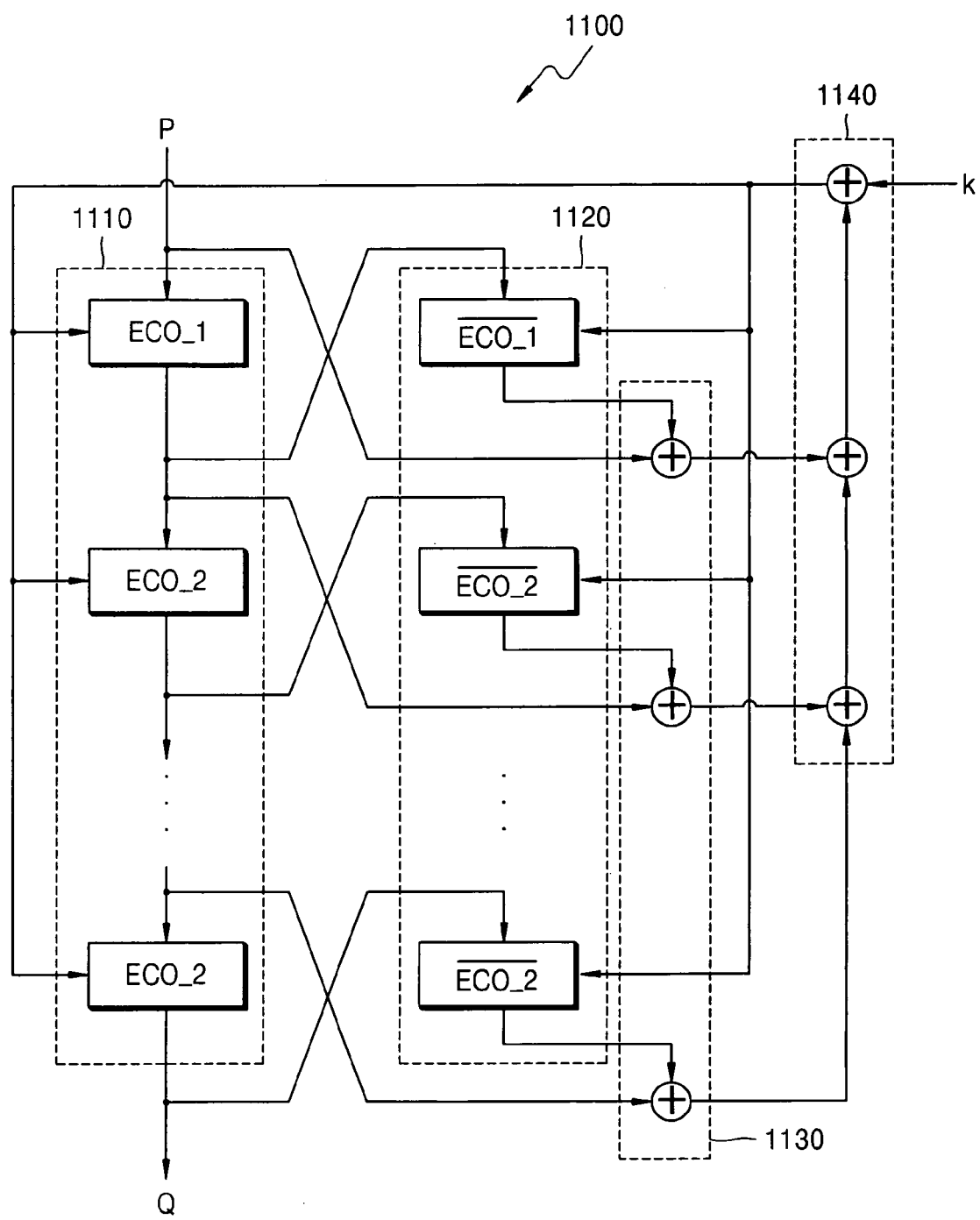
FIG. 11 is a block diagram of a scalar multiplication apparatus having a scalable regular structure for hardware pipeline implementation of FIG. 5 according to an example embodiment of the present invention.

FIG. 11 is a block diagram of a scalar multiplication apparatus 1100 having a scalable regular structure for a hardware pipeline implementation of FIG. 5 according to an example embodiment of the present invention. Referring to FIG. 11, a first encryptor 1110, a second encryptor 1120, a first XOR circuit 1130, and a second XOR circuit 1140 included in the scalar multiplication apparatus 1100 may have similar operations and functions to the respective devices of FIG. 5. However, the scalar multiplication apparatus 1100 may have a structure in which the first encryptor 1110 and the second encryptor 1120 repeatedly perform the EC operation over several operations. Similar to the scalar multiplication apparatus of FIG. 9, instead of a single EC operation, the scalar multiplication apparatus 1100 may perform several EC operations.

Each of the first encryptor 1110 may generate an encrypted output point from an input point $P$ by performing the EC operation. The first encryptor 1110 may generate an encrypted output point for a subsequent round from the encrypted output point of a previous round by performing the EC operation. The operation may be consecutively performed for at least two operations. The second encryptor 1120 may generate an encrypted output point for each round from an output point of a corresponding round of the first encryptor 1110 by performing the inverse EC operation.

The first XOR circuit 1130 may perform XOR operations of the encrypted output points generated for respective operations of the first encryptor 1110 and the encrypted output points generated for respective operations of the second encryptor 1120. The second XOR circuit 1140 may perform an XOR operation of the operation results of the first XOR circuit 1130 and a secret key k to generate the XOR operation result as the (modified) secret key k input to the first and second encryptors 1110 and 1120.

Figure 12:
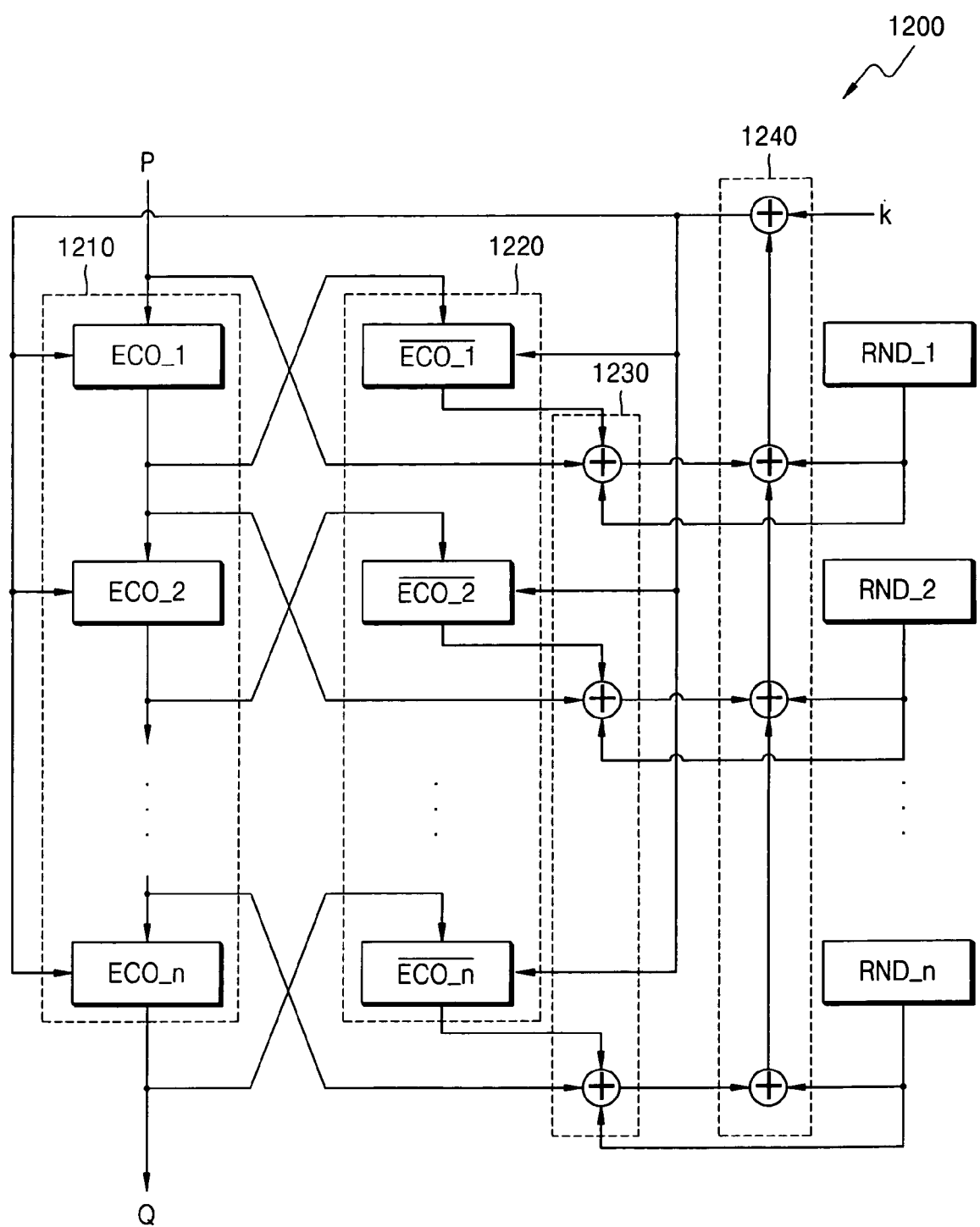
FIG. 12 is a block diagram of a scalar multiplication apparatus in which the scalar multiplication apparatus of FIG. 11 operates by random number data according to an example embodiment of the present invention.

FIG. 12 is a block diagram of a scalar multiplication apparatus 1200 in which the scalar multiplication apparatus 1100 of FIG. 11 operates by random number data generated by a random number generator (not shown) according to an example embodiment of the present invention. Referring to FIG. 10, a first encryptor 1210, a second encryptor 1220, a first XOR circuit 1230 and a second XOR circuit 1240 included in the scalar multiplication apparatus 1200 may have similar operations and functions to the respective devices of FIG. 11. However, the scalar multiplication apparatus 1200 may operate by random number data $RND\_1, RND\_2, \ldots, RND\_n$ for respective operations generated by a random number generator.

The first XOR circuit 1230 may perform XOR operations of the encrypted output points generated for respective operations of the first encryptor 1210, the encrypted output points generated for respective operations of the second encryptor 1220, and the random number data $RND\_1, RND\_2, \ldots, RNDn$ for the respective operations. The second XOR circuit 1240 may perform an XOR operation of the respective operation results of the first XOR circuit 1230, a secret key $k$, and the respective random number data $RND\_1, RND\_2, \ldots, RND\_n$ to generate the XOR operation result as the (modified) secret key $k$ input to the first and second encryptors 1210 and 1220.

As described above, the scalar multiplication apparatuses 200, 500, 700, 800, 900, 1000, 1100 and 1200 may modify the original secret key value $k$ to the modified key value $\tilde{k} \ne k$ when a fault occurs in the scalar multiplication computation process. As a result, the original secret key value $k$ may not be divulged.

For example embodiments of the present invention may be written as computer programs and may be implemented in general-use digital computers that execute the programs using a computer-readable recording medium. Examples of the computer-readable recording medium may include magnetic storage media (e.g., ROM, floppy disks, hard disks, etc.), optical recording media (e.g., CD-ROMs, DVDs, etc.), and storage media such as carrier waves (e.g., transmission through the internet). The computer-readable recording medium may also be distributed over networks coupled computer systems so that the computer-readable code is stored and executed in a distributed fashion.

As described above, in a scalar multiplication apparatus and method according to example embodiments of the present invention, XOR operations are performed prior to a final output, and no fault check is performed in an output process where the secret key may be vulnerable to attack. Accordingly, it may be advantageous for the scalar multiplication apparatus and method to be applied to a crypto-system requiring DFA attack-resistance and/or a quick operational speed. In addition, the scalar multiplication apparatus and method may be applied to counter SCA attacks against a (Non Adjacent Form) NAF-based scalar multiplication algorithm. Moreover, the scalar multiplication apparatus and method may be easily adapted to all kinds of cryptographic algorithms using a symmetry key or an asymmetry key through a small modification.

While the present invention has been particularly shown and described with reference to example embodiments thereof, it will be understood by those skilled in the art that various changes in form and details may be made therein without departing from the scope of the present invention. The above-described embodiments should be considered in a descriptive sense only and are not for purposes of limitation.

What is claimed is:

1. A scalar multiplication apparatus, comprising:
    a first encryptor for receiving an input point and a changed secret key to generate a first encrypted output point;
    a second encryptor for receiving the first encrypted output point and the changed secret key to perform an inverse operation and generate a second encrypted output point;
    a first XOR circuit for receiving the input point and the second encrypted output point to perform a first XOR operation;
    a second XOR circuit for receiving the first XOR operation result of the first XOR circuit and a secret key to perform a second XOR operation and generate the changed secret key; and
    a random number generator for generating random number data;
    wherein the first encryptor generates the first encrypted output point from the input point and secret key by performing an elliptic curve (EC) operation,
    wherein the first encryptor generates the second encrypted output point for a subsequent operation from the first encrypted output point of a previous operation by performing the EC operation,
    wherein the first and second encrypted output points are generated for at least two operations,
    wherein the second encryptor generates the second encrypted output point for every operation from the first encrypted output point and secret key by performing an inverse EC operation,
    wherein the first XOR circuit performs the first XOR operation for every operation on the first encrypted output point generated in each operation by the first encryptor and the second encrypted output point generated in each operation by the second encryptor, wherein the first XOR circuit receives the input point, the second encrypted output point, and the random number data to perform the first XOR operation of the input point, and wherein the second XOR circuit receives the first XOR operation result, the secret key, and the random number data to perform the second XOR operation.

2. The apparatus of claim 1, wherein the first encryptor performs the EC operation using parameters input from a non-volatile memory, wherein the second encryptor performs the inverse EC operation using the parameters input from the non-volatile memory, and wherein the non-volatile memory stores the secret key.

3. The apparatus of claim 1, wherein the first and second encryptors receive the secret key if no fault is detected in the first and second encryptors, and wherein the first and second encryptors receive a modified secret key if a fault is detected in the first and second encryptors.

4. A scalar multiplication method, comprising:

receiving an input point and a changed secret key;

generating a first encrypted output point and a second encrypted output point from the input point and the changed secret key;

performing a first logic operation on the first encrypted output point and the second encrypted output point; and performing a second logic operation on a first logic operation result and a secret key and generating the changed secret key;

wherein generating the first and second output points includes:

generating an encrypted output point from the input point by performing an elliptic curve (EC) operation; and generating an encrypted output point for a subsequent round from the encrypted output point of a previous round by performing the EC operation, and respective output points encrypted for at least two operations are generated as the first output point and the second output point; and wherein the first logic operation is performed in each round for the encrypted first output point and encrypted second output point generated in each round.

5. The method of claim 4, wherein generating the first and second encrypted output points further includes performing the EC operation using desired parameters.

6. The method of claim 4, wherein the first and second encrypted output points are generated in parallel.

7. The method of claim 4, wherein the first and second encrypted output points are sequentially generated.

8. The method of claim 4, wherein the first logic operation is performed on the first encrypted output point, the second encrypted output point, and generated random number data.

9. A scalar multiplication method, comprising:

receiving an input point and a changed secret key;

generating a first encrypted output point from the input point and the changed secret key;

generating a second encrypted output point from the first encrypted output point and the changed secret key by performing an inverse operation;

performing a first XOR operation on the input point and the second encrypted output point; and performing a second XOR operation on the first XOR operation result and a secret key and generating the changed secret key;

wherein generating the first encrypted output point includes:

generating an encrypted output point from the input point by performing an elliptic curve (EC) operation; and generating an encrypted output point of a subsequent operation from the encrypted output point of a previous operation by performing the EC operation, and the output point encrypted for at least two operations is generated as the first encrypted output point;

wherein generating the second encrypted output point includes:

generating the encrypted output point of each round from the first encrypted output point for a corresponding round by performing the inverse EC operation; and wherein the first XOR operation is performed in each round for the input point of each round used for the generation of the first encrypted output point and the second encrypted output point generated in each round.

10. The method of claim 9, wherein generating the first encrypted output point further includes performing the EC operation using desired parameters, and wherein generating the second encrypted output point further includes performing the inverse EC operation on the first encrypted output point and the secret key.

11. The method of claim 9, wherein the first XOR operation is performed on the first encrypted output point, the second encrypted output point, and generated random number data.

* * * * *